Jan. 12, 1954 W. H. INGERSOLL 2,665,789
MAGNETIC CLUTCH
Filed Dec. 18, 1950
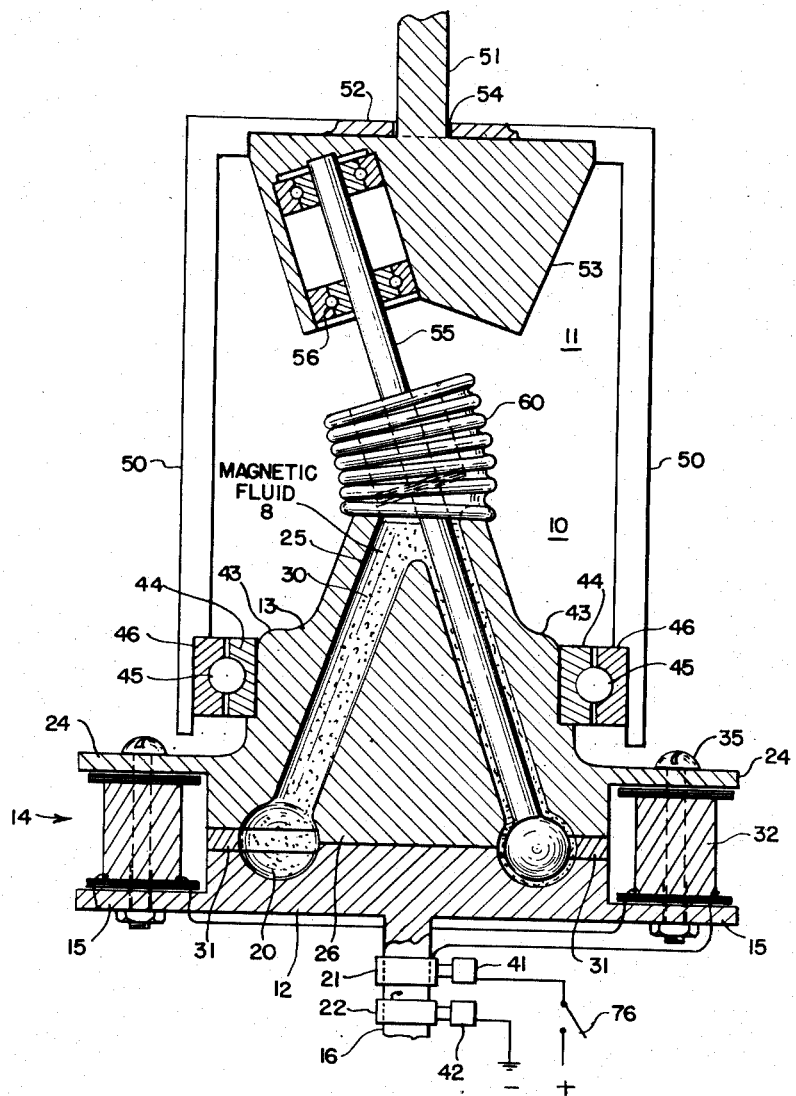
Inventor
WARD H. INGERSOLL
By George H. Fisher
Attorney Patented Jan. 12, 1954

2,665,789

UNITED STATES PATENT OFFICE 2,665,789

MAGNETIC CLUTCH

Ward H. Ingersoll, St. Paul, Minn., assignor to Minneapolis-Honeywell Regulator Company, Minneapolis, Minn., a corporation of Delaware Application December 18, 1950, Serial No. 201,453

11 Claims. (Cl. 192—21.5)

My invention relates to electromagnetic clutches and more particularly to clutches employing a magnetic fluid as a clutching medium. The use of a magnetic fluid as a clutching medium or surface is a recent development in the art. The clutches using magnetic fluids at the present time all have a disadvantage in that they require a liquid tight seal between the rotary members of the clutch which seals are subject to rapid deterioration in the presence of the magnetic particles in the fluid. Similarly these clutch designs locate the bearing surfaces for the clutching members in contact with the magnetic fluid such that they are similarly subject to excessive wear and mechanical breakdown due to the magnetic particles in the fluid.

The present invention discloses an electromagnetic clutch of the magnetic fluid type in which the core of the electromagnet with the magnetic fluid therein is mounted on one of the clutch elements while a portion of a cooperating clutch element is flexibly mounted on the first clutch element for conoidal motion but nonrotative movement and this portion is journaled in a flange on another rotating member which forms the output portion of the clutch. This arrangement of parts permits the sealing of the magnetic fluid within one of the clutch elements with a nonrotative type of seal while permitting relative clutching action between the input and output elements of the clutch. With this arrangement the bearings required for the rotating members are removed from the presence of the magnetic fluid.

It is therefore an object of this invention to provide an improved magnetic fluid type of electromagnetic clutch.

It is also an object of this invention to provide a clutch in which magnetic fluid is positively sealed within and remote from the relatively rotating parts of the clutch so as not to effect wear of relatively rotating parts.

It is further an object of this invention to provide a clutch of the magnetic fluid type wherein the bearings are located remote from or out of contact with the magnetic fluid to eliminate bearing wear.

Another object of this invention is to provide a clutch of the magnetic fluid type which is simple in design and is easy to manufacture and maintain.

These and other objects of this invention will become evident from a reading of the attached specification together with the drawing wherein the clutch is diagrammatically shown in a single figure with parts in section.

My improved magnetic clutch comprises two relatively movable clutch members generally indicated at 10 and 11, which members are interchangeable as to driving and driven function. For the purpose of this disclosure, the clutch member 10 will be referred to as the driving element as if it were connected to a power unit in a transmission system (not shown) and clutch member 11 as a driven element or output portion of the power transmission system.

Clutch member 10 is the controlling portion of the clutch and houses the electromagnetic core structure to be described below, and a clutching medium 8 of the magnetic fluid type. Member 10 is generally conical in form and is divided into two magnetic structures or parts 12 and 13 which are energized by a plurality of electromagnets indicated at 14. Magnetic part 12 of clutch member 10 is generally cylindrical in form, being made of a magnetic material and having an annular flange 15 at the outer periphery thereof. Formed integral and concentric therewith is a driving shaft 16 for the clutch. Part 12 has at the surface thereof opposite the shaft 16 an annular groove indicated at 20 the purpose of which will become evident as the disclosure proceeds. A pair of slip ring members 21, 22 mounted on shaft 16 are adapted to provide the energization circuit for the electromagnets 14, as will be later described. The structure or part 13 of clutch member 10 is shaped similar to a truncated cone and has projecting around its outer periphery a flange 24 of similar dimensions to the flange 15 of part 12. Part 13 is similarly made of a magnetic material and has a conically shaped opening 25 therein. Within the opening 25 and attached to part 12 is an inner magnetic section or pole 26, also conical in form which forms with structure 13 a conoidal annular opening or air gap 30. The structure or parts 12 and 13 of clutch member 10 are separated or spaced apart by an annular ring of nonmagnetic or insulating material 31 such that a two part magnetic core structure is obtained, the magnetic parts being separated from one another by air gap 30 and ring 31. While member of pole 26 is shown as a separate part which is attached to structure 12 by suitable means, not shown, it is to be understood that this part may be formed integral with structure 12 if desired. Similarly the parts 12 and 13 are so shaped for simplicity in construction and assembly, it being understood that these parts can take any form so long as they are structurally and magnetically separated from one another by an air gap such as the opening 30.

Between the flanges 15 and 24 of parts 12 and 13 are positioned the plurality of electromagnets 14, only two of which are shown in the drawing for purposes of simplicity. The electromagnets 14 each comprise a winding 32 mounted on a magnetic core (not shown) are are so positioned between the annular rings or flanges 15 and 24 that the magnetic cores are in contact at their extremities with their respective flanges being concealed thereby. The cores are attached between the respective flanges by a suitable means such as a nut and bolt connection indicated at 35. The nut and bolt connections 35 serve a dual function in that they hold the parts 12 and 13 and electromagnets 14 in assembled relationship and clamp the flanges 15 and 24 integral therewith in contact with the core members of the electromagnets 14. The coils 32 of the electromagnets 14 may be connected in either a series or parallel relationship, the number of electromagnets being used and the particular connection depending upon the source of power and the strength of the magnetic field required to operate the clutch. When so connected, the electromagnets upon energization of the coils polarize or magnetize the parts 12 and 13 with opposite magnetic polarities which polarities will be present in the portions of the members abutting the conoidal annular gap 30. Power is supplied to the coils by means of slip rings 21 and 22 which cooperate with brushes 41, 42, the latter being connected to a D. C. source of energizing current.

Part 13 of clutch member 10 has an external annular shoulder formed thereon, indicated at 43 upon which is positioned an annular bearing ring or race 44 of a bearing 45. Race 44 of bearing 45 may be secured on the shoulder 43 of member 10 by any suitable means such as press fitting. An outer race 46 of bearing 45 is adapted to be similarly connected to a pair of positioning arms 50 of clutch member 11. For simplicity, the structure which positions clutch member 11 on the clutch member 10 has been shown as having a pair of arms 50 or bifurcated members which attach to a shaft 51 forming the output portion of the clutch. The arms 50 extend from the concentrically located cylindrical portion 52, this circular portion 52 being attached to a bearing flange 53 which is mounted on or formed integral with shaft 51. It is to be understood that the positioning structure heretofore described may take a plurality of forms such as one having multiple arms each attached to the outer race 46 of bearing 45 or as a cylindrical drum.

Bearing flange 53 of clutch member 11 mounts an extended crank arm projection or shaft 55 in an angular position in and through bearings indicated at 56. Shaft 55 is therefore attached to flange 53 and shaft 51 for rotation relative to these members along the axis of shaft 55 and for non-relative rotation with these members as will become evident as the disclosure proceeds. The opposite end of shaft 55 is shows spherical in form and is positioned in a grooved portion 20 of the annular opening or air gap 30 formed by the parts 12 and 13 of clutch member 10. It is to be understood that the shaft 55 with its spherical end may take many similar forms and this invention shall not be limited to the form shown here for simplicity in this specification. The shaft may be conical in form with the base of the cone a flat plane or spherical shape. The length of shaft 55 is such that it extends to within a small distance from the surface of the annular groove 20 formed in part 12 and is spaced from the part 13 and pole 26 by a similar distance to define a small air gap therebetween. Attached near the midpoint of shaft 55 is a bellows member 60. The opposite extremity of bellows 60 is attached to the upper truncated end of conical shaped member 13. The bellows 60 is so attached to the part 13 and to the shaft 55 as to form a positive liquid tight seal at these members closing the opening of the gap 30. Within the air gap 30 is placed the magnetic fluid fill of the type currently used in magnetic fluid clutches. The fluid fill 8 contains particles of magnetic material suspended in a fluid having an oil base. The suspension when brought into the presence of a magnetic field is such that the magnetic particles therein become magnetized so that the mixture acts as a solid mass. In this manner the fluid forms a clutching medium which acts between the clutch member 10 and the shaft 55, of clutch member 11 to form a positive driving connection.

In operation, the driving portion of the clutch or clutch member 10 is adapted to be connected to any suitable driving unit and be rotated thereby. Slip rings 21 and 22 and brush assemblies 41, 42 connect coils 32 of electromagnets 14 to the source of power at all times. As noted above a D. C. source of power is used to energize the coils 32 of the electromagnets. A suitable control means, such as the switch 76, may be used to connect and disconnect these coils from the power supply. With the electromagnets 14 deenergized, the magnetic fluid in the clutch remains fluid and no positive connection is formed between the shaft 55 and the clutch member 10. The shaft 55 is adapted to rotate about the axis formed by the bearings 56 in flange member 53 maintaining the same oblique angular relationship with the axis formed by the shafts 51 and 16. Under this condition, the shaft 51 and the arms 50 remain stationary and permit relative rotation of the clutch member 10 through the bearings 44. The shaft 55 which is attached to the driving portion or clutch member 10 by the bellows 60 is passed in a sort of stirring motion through the magnetic fluid in the gaps 30 and 20 formed by parts 12 and 13 as the driving unit is rotated by the power unit. Thus when the clutch is deenergized the shaft 55 has a tendency to describe a conoidal path relative to the opening 30. However, due to the connection of the shaft 55 through the bellows 60 to part 13, the shaft will rotate about the axis formed by the bearings 56 and the connection between the bellows and the shaft, the bellows describing a rotational movement and being flexed as the shaft rotates. It is to be understood that flexible members other than a bellows may secure the shaft to the driving portion or clutch member 10 and such members may similarly seal the annular gap 30 between the shaft 55 and part 13.

With the controlling circuit of the clutch completed by means of closure of switch 76, the power supplied to the coils 32 of electromagnets 14 will magnetize the part 12 including 26 and part 13 with opposite magnetic polarities and similarly magnetize the magnetic fluid 8 within the gaps 30 and 20 to solidify the same. When the magnetic fluid is in a solid state due to the magnetic effect upon the particles in the fluid, the shaft 55 is held stationary in the gaps 20 and 30 and relative sliding motion between the shaft 55 and the driving portion 10 of the clutch is prevented. Therefore the rotational movement applied to clutch member 10 will cause the shaft 55 to describe a twin conoidal pattern, being stationary with respect to both the driving clutch member 10 and driven clutch member 11. Such rotation causes the driven portion or clutch member 11 to rotate with the driving portion or clutch member 10. Thus in the energized position of the clutch, shaft 55 has no rotation relative to the flange 53 and shaft 51. As soon as the coils 32 of electromagnets 14 are deenergized, the magnetic fluid 8 loses its solid state and the relative movement of the driven clutch member 11 and driving clutch member 10 described above will be resumed.

In considering this invention it should be kept in mind that the present disclosure is intended to be illustrative only and that the scope of the invention is to be determined only by the appended claims.

I claim as my invention:

1. In a clutch, a driven member, a driving member, a bellows member attached to said driving member, said driving member having a conoidal annular opening therein, means journaling said driven member on said driving member, a shaft mounted intermediate its extremities on said driving member through said bellows member and journaled at one extremity on said driven member, said shaft at its opposite extremity being positioned in said conoidal opening of said driving member, and means included in said driving member for selectively rigidly connecting said shaft and said driving member.

2. In a clutch, a driving member, a driven member, a flexible member attached to said driving member, said driving member having a conoidal annular opening therein, means journaling said driven member on said driving member, an intermediate member mounted along its extent on said driving member through said flexible member and journaled at one extremity on said driven member, said intermediate member at its opposite extremity being positioned in said conoidal annular opening of said driving member, and means included in said driving member for selectively and rigidly connecting said intermediate member and said driving member.

3. In a clutch, a driven member, a driving member, a bellows member attached to said driving member, said driving member having a conoidal annular opening therein, means journaling said driven member on said driving member, a shaft mounted intermediate its extremities on said driving member through said bellows member and journaled at one extremity on said driven member, said shaft at its opposite extremity being positioned in said conoidal opening of said driving member, and means included in said driving member for selectively connecting said shaft and said driving member, said bellows member forming a liquid tight seal between said shaft and said driving member.

4. In a clutch, a driven member, a driving member having a conoidal annular opening therein, a bellows member attached to said driving member, an intermediate member mounted along its extent on said driving member through said bellows member and journaled at one extremity on said driven member, said intermediate member at its opposite extremity being positioned in said concidal annular opening of said driving member, a magnetic fluid fill in said annular opening of said driving member, said bellows member forming a liquid tight seal for said annular opening between said intermediate member and said driving member, and means including said magnetic fluid fill for selectively and rigidly connecting said intermediate member to said driving member.

5. In a clutch, a driven member, a driving member having a conoidal annular opening therein, a bellows member attached to said driving member, an intermediate member mounted along its extent on said driving member through said bellows member and journaled at one extremity on said driven member, said intermediate member at its opposite extremity being positioned in said conoidal annular opening of said driving member, a magnetic fluid fill in said annular opening of said driving member, said bellows member forming a liquid tight seal for said annular opening between said intermediate member and said driving member, and electromagnetic means mounted on said driving member for selectively magnetizing portions of said driving member and said magnetic fluid fill to rigidly secure said intermediate member in said annular opening of said driving member.

6. In a clutch, a driving member, a driven member, one of said members having a conoidal annular opening therein, a shaft journaled on the other of said members and flexibly connected to said one of said members to describe a conoidal motion within said opening in said one of said members, and means for selectively and rigidly securing said shaft in said opening in said one of said members.

7. In a clutch, a driving member, a driven member, one of said members having a conoidal annular opening therein, an intermediate member journaled on the other of said members, means flexibly connecting said intermediate member along its extent to said one of said members to describe a conoidal motion within said opening in said one of said members, said flexible connecting means forming a seal for said opening in said one of said members, and means for selectively and rigidly securing said shaft in said opening in said one of said members.

8. In a clutch, a driving member, a driven member, one of said members having a conoidal annular opening therein, an intermediate member journaled on the other of said members, means flexibly connecting said intermediate member along its extent to said one of said members to describe a conoidal motion within said opening in said one of said members, said flexible connecting means forming a seal for said opening in said one of said members, and means including a magnetic fluid fill in said opening in said one of said members for rigidly securing said intermediate member in said opening to said one of said members.

9. In a clutch, a driving member, a driven member, one of said members having a conoidal annular opening therein, an intermediate member journaled on the other of said members, means flexibly connecting said intermediate member along its extent to said one of said members to describe a conoidal motion within said opening in said one of said members, said flexible connecting means forming a seal for said opening in said one of said members, a magnetic fluid fill in said opening in said one of said members, and means for selectively magnetizing said magnetic fluid fill to rigidly secure said intermediate member in said opening in said one of said members.

10. In a clutch, a driving member, a driven member, one of said members having a conoidal annular opening therein, an intermediate member journaled on the other of said members, means for flexibly connecting said intermediate member to said one of said members to describe a conoidal motion within said opening in said one of said members, said one member having a plurality of parts of magnetic material so positioned to form said opening, a fill of magnetic fluid in said opening, and a plurality of electromagnetic members associated with said one of said members to selectively magnetize said parts and said fluid to rigidly position said intermediate member in said opening.

11. In a clutch, a driving member, a driven member, one of said members having a conoidal annular opening therein, an intermediate member journaled on the other of said members, means for flexibly connecting said intermediate member to said one of said members to describe a conoidal motion within said opening in said one of said members, said one member having a plurality of parts of magnetic material so positioned to form said opening, a fill of magnetic fluid in said opening, a surface on said intermediate member disposed within said opening and immersed in said magnetic fluid, and magnetic means common to said parts of said one of said members for magnetizing the same with opposite magnetic polarities, said magnetic fluid when said parts are magnetized forming a positive mass between said surface of said intermediate member and said parts of said one of said members.

WARD H. INGERSOLL.

References Cited in the file of this patent

UNITED STATES PATENTS

| Number | Name | Date |
|---|---|---|
| 2,454,340 | Reichel | Nov. 23, 1948 |

FOREIGN PATENTS

| Number | Country | Date |
|---|---|---|
| 347,676 | Great Britain | Apr. 24, 1931 |

OTHER REFERENCES

Technical Report 1213, National Bureau of Standards, Washington, D. C. (Copy received in Div. 68 on March 30, 1948.)